J. J. HULL.
Nut-Wrench.

No. 105,336.  Patented July 12, 1870.

Witness  
James Watson  
Sam. G. Hall.

Jas. J. Hull  
 pr Boyd Eliot atty for  
Inventor.

United States Patent Office.

JAMES J. HULL, OF BROOKLYN, NEW YORK.

Letters Patent No. 105,336, dated July 12, 1870.

IMPROVEMENT IN WRENCHES.

The Schedule referred to in these Letters Patent and making part of the same

I, JAMES J. HULL, of the city of Brooklyn, county of Kings and State of New York, have invented certain Improvements in Wrenches, of which the following is a specification.

Nature and Object.

My invention relates to that class of wrenches having adjustable jaws of different degrees of strength and opening; and The object of this invention is to secure a quicker motion to the jaws in making their adjustments without losing anything in strength.

This is accomplished by the use of a double-threaded nut, one to the right and the other to the left, and corresponding threads upon the bars that carry the jaws; consequently one-half the motion only is required to open or close the jaws that would be necessary in a single-threaded screw, while, at the same time, the full strength of the threads is preserved.

Drawing.

Figure 1:
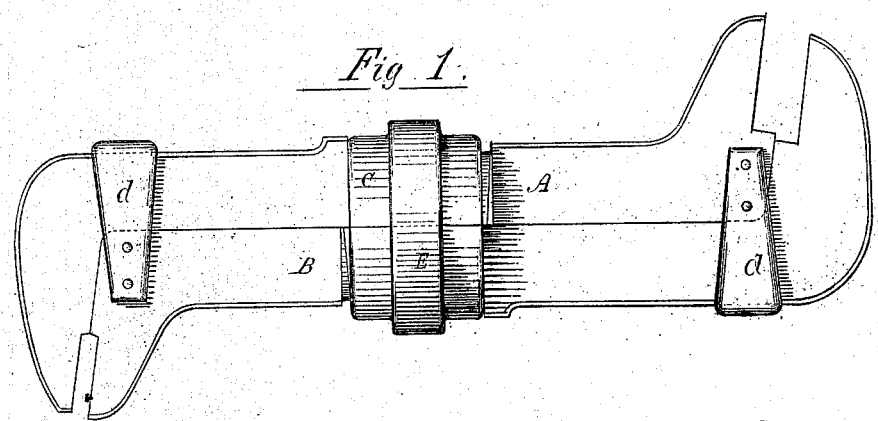

Figure 1 is a side view of the wrench with the jaws closed.

Figure 2:
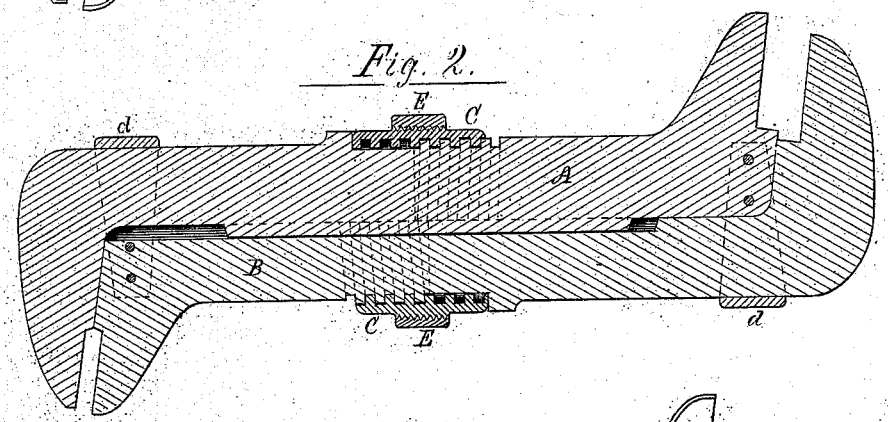

Figure 2, a longitudinal section through both jaws.

Figure 3:
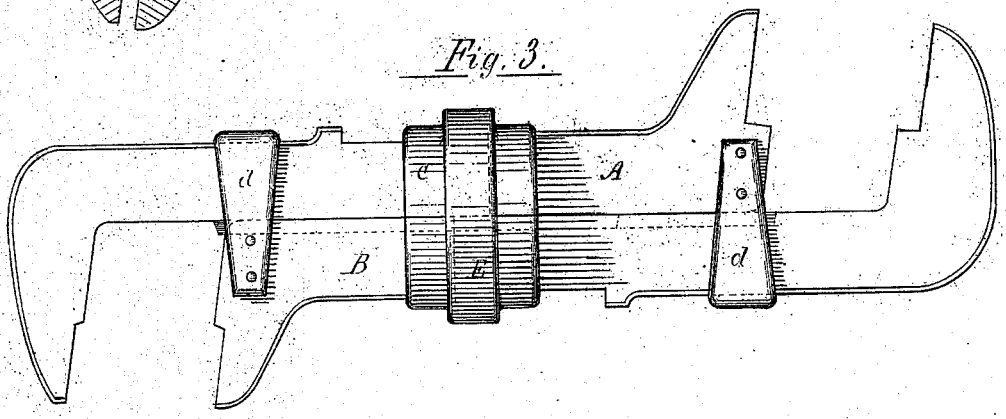

Figure 3 is the same view as fig. 1 but with the jaws opened.

A and B are the two bars that carry their jaws at their extremities.

C is the double-threaded nut formed in two parts, and, when placed in position, is fastened together by a band, E, which band may be either screwed, shrunk, or driven on and fastened in any convenient manner.

At $d$ are loops to assist in guiding the jaws, in addition to the rib in the center, as shown in the section, fig. 2, but they also assist greatly in holding the jaws together in working and relieving a spreading strain upon the nut.

In section, fig. 2, the two threads are plainly shown, and it is evident that one revolution of the nut will give twice the opening to the jaws that would be produced by a single-threaded nut of the same pitch of thread; but a single thread with twice the pitch will not have as much strength as this arrangement.

Hence, what I claim, is—

An adjustable wrench, formed by the combination of the two bars A and B, double-threaded nut C, and band E, as described, and for the purpose set forth.

JAMES J. HULL.

Witnesses:
BOYD ELIOT,
SAM. G. HALL.